United States Patent
Lee et al.

(10) Patent No.: US 12,446,239 B2
(45) Date of Patent: Oct. 14, 2025

(54) CAPACITOR, METHOD OF FABRICATING THE CAPACITOR, AND ELECTRONIC DEVICE INCLUDING THE CAPACITOR

(71) Applicants: Samsung Electronics Co., Ltd., Suwon-si (KR); AJOU UNIVERSITY INDUSTRY-ACADEMIC COOPERATION FOUNDATION, Suwon-si (KR)

(72) Inventors: Changsoo Lee, Seoul (KR); Sangwoon Lee, Suwon-si (KR); Yongsung Kim, Suwon-si (KR); Jinhong Kim, Seoul (KR); Hyungjun Kim, Suwon-si (KR); Jooho Lee, Hwaseong-si (KR)

(73) Assignees: Samsung Electronics Co., Ltd., Gyeonggi-do (KR); Ajou, University Industry-Academic Cooperation Foundation, Gyeonggi-do (KR)

( * ) Notice: Subject to any disclaimer, the term of this patent is extended or adjusted under 35 U.S.C. 154(b) by 629 days.

(21) Appl. No.: 17/861,577

(22) Filed: Jul. 11, 2022

(65) Prior Publication Data
US 2023/0143124 A1  May 11, 2023

(30) Foreign Application Priority Data

Nov. 9, 2021  (KR) .......................... 10-2021-0153444

(51) Int. Cl.
*H10D 1/68* (2025.01)
*H01G 4/008* (2006.01)
(Continued)

(52) U.S. Cl.
CPC .............. *H10D 1/682* (2025.01); *H01G 4/008* (2013.01); *H01G 4/10* (2013.01); *H01G 4/1227* (2013.01);
(Continued)

(58) Field of Classification Search
CPC ........ H10D 1/682; H10D 1/684; H10D 1/688; H01G 4/008; H01G 4/10; H01G 4/1227
See application file for complete search history.

(56) References Cited

U.S. PATENT DOCUMENTS 6,040,594 A     3/2000  Otani
6,958,267 B2 * 10/2005  Basceri ............ H01L 21/31691
                                                438/240
(Continued)

FOREIGN PATENT DOCUMENTS

EP    2166562 A2 *  3/2010  ........... C23C 16/409
EP    2434531 B1 * 12/2019  ........... C23C 16/409
(Continued)

OTHER PUBLICATIONS

JP 2000269463 A—Machine English Translation (Year: 2025).*
(Continued)

*Primary Examiner* — Jose R Diaz
(74) *Attorney, Agent, or Firm* — Harness, Dickey & Pierce, P.L.C.

(57) ABSTRACT

A capacitor includes a lower electrode including a perovskite material, an upper electrode spaced apart from the lower electrode, a dielectric layer positioned between the lower electrode and the upper electrode and including a perovskite material, and a passivation layer positioned between the lower electrode and the dielectric layer and including $Sr_xTi_yO_3$ in which a content of Ti is greater than a content of Sr.

20 Claims, 14 Drawing Sheets

(51) Int. Cl.
   *H01G 4/10*   (2006.01)
   *H01G 4/12*   (2006.01)
   *H10B 12/00*  (2023.01)

(52) U.S. Cl.
   CPC .......... *H10B 12/033* (2023.02); *H10D 1/692* (2025.01); *H10D 1/696* (2025.01); *H01G 4/12* (2013.01)

(56) References Cited

U.S. PATENT DOCUMENTS

| | | | |
|---|---|---|---|
| 8,679,913 | B2 | 3/2014 | Kawano et al. |
| 8,946,036 | B2 | 2/2015 | Chi et al. |
| 10,043,655 | B2 | 8/2018 | Swaminathan et al. |
| 10,186,570 | B2 | 1/2019 | Hendrix et al. |
| 2019/0148067 | A1 | 5/2019 | Hirata |
| 2019/0148390 | A1 | 5/2019 | Frank |
| 2019/0165088 | A1 | 5/2019 | Cho et al. |
| 2019/0267383 | A1 | 8/2019 | Rocklein et al. |
| 2019/0355806 | A1 | 11/2019 | Kang et al. |
| 2020/0020780 | A1 | 1/2020 | Kim |
| 2020/0312952 | A1 | 10/2020 | Cho et al. |
| 2020/0321472 | A1 | 10/2020 | Ramamoorthy et al. |
| 2023/0253444 | A1* | 8/2023 | Sen Gupta ............. H10D 1/684 257/295 |

FOREIGN PATENT DOCUMENTS

| | | | |
|---|---|---|---|
| JP | 2000269463 | A * | 9/2000 |
| JP | 3108797 | B2 | 11/2000 |
| JP | 2001-250923 | A | 9/2001 |
| JP | 2001-267517 | A | 9/2001 |
| JP | 2011-238777 | A | 11/2011 |
| WO | WO-09041219 | A1 | 4/2009 |

OTHER PUBLICATIONS

Ryan Jacobs, et a;. "Understanding and controlling the work function of perovskite oxides using Density Functional Theory," Department of Materials Science and Engineering, Adv. Fun. Mater. 26(30) 5471, pp. 1-32 (2016).
Rosine Coq Germanicus, et al. "Three dimensional resistance mapping of self-organized Sr3V2O8 nanorods on metallic perovskite SrVO3 matrix," Applied Surface Science 510, 145522, pp. 1-8 (2020).
Sang Woon Lee, et al. "Atomic Layer Deposition of SrTiO3 Thin Films with Highly Enhanced Growth Rate for Ultrahigh Density Capacitors," Chemistry of Materials, No. 23, pp. 2227-2236 (2011).
J.H. Shim, et al. "Process-property relationship in high-k ALD SrTiO3 and BaTiO3: a reviwq," Journal of Materials Chemistry C, No. 5, pp. 8000-8013 (2017).
J.A. Kittl, et al. "High-k dielectrics for future generation memory devices (Invited Paper)," Microelectronic Engineering, No. 6, pp. 1789-1795 (2009).

* cited by examiner

CAPACITOR, METHOD OF FABRICATING THE CAPACITOR, AND ELECTRONIC DEVICE INCLUDING THE CAPACITOR

CROSS-REFERENCE TO RELATED APPLICATION

This application is based on and claims priority under 35 U.S.C. § 119 to Korean Patent Application No. 10-2021-0153444, filed on Nov. 9, 2021, in the Korean Intellectual Property Office, the disclosure of which is incorporated by reference herein in its entirety.

BACKGROUND

Some example embodiments relate to a capacitor, a method of fabricating the capacitor, and/or an electronic device including the capacitor.

According to the recent trend of making highly functional, highly efficient, small-sized, and lightweight electronic devices, reducing the size and/or improving the performance of electronic components such as capacitors used in electronic devices have rapidly progressed.

In particular, as semiconductors are scaled-down, improvement of a dielectric constant of a dielectric layer included in a capacitor to realize high capacitance in the same area is desired or required. In accordance with the trend towards the integration of electronic components, structural improvements have been made not only through improvement of material properties but also through improvement of process capabilities. Also, under the current situation where the improvement in the physical structure of electronic components has reached its limit, the development of new materials to obtain material properties superior to the existing ones is called for or is being pursued.

Accordingly, to provide materials having a high dielectric constant to replace or to complement silicon oxide, aluminum oxide, or the like, which have been used as a dielectric layer for capacitors, research into binary oxides such as hafnium dioxide ($HfO_2$), zirconium oxide ($ZrO_2$), tantalum oxide ($Ta_2O_5$), titanium dioxide ($TiO_2$), and/or the like and perovskite materials such as strontium titanate ($SrTiO_3$) and (Ba, Sr)$TiO_3$ has been conducted.

When a dielectric layer including a perovskite material is used in a capacitor, it is required or desired to secure the crystallinity of the dielectric layer. To this end, it is necessary or desirable to use an electrode showing high mutual consistency with a dielectric layer including a perovskite material. For example, a capacitor including a dielectric layer having a high dielectric constant may be fabricated by sequentially stacking an SRO electrode and a dielectric layer including $SrTiO_3$, which show good mutual consistency with each other. However, during an operation of forming a $SrTiO_3$ dielectric layer on an SRO electrode, the SRO electrode may be oxidized or natively oxidized, which deteriorates the function of the SRO electrode as an electrode. Accordingly, there is a need or desire for a method of fabricating a capacitor which may more stably form a $SrTiO_3$ dielectric layer on an electrode having good mutual consistency with the $SrTiO_3$ dielectric layer.

SUMMARY

Provided are a capacitor including a lower electrode including a perovskite material and a dielectric layer including $SrTiO_3$, a method of fabricating the capacitor, and/or an electronic device including the capacitor.

Alternatively or additionally, provided are a capacitor of which a lower electrode is prevented or reduced in likelihood from being oxidized in an operation of forming a dielectric layer by including a Ti-rich passivation layer between the lower electrode and the dielectric layer including $SrTiO_3$, a method of fabricating the capacitor, and/or an electronic device including the capacitor.

Additional aspects will be set forth in part in the description which follows and, in part, will be apparent from the description, or may be learned by practice of the presented embodiments of the disclosure.

According to some example embodiments, a capacitor includes a lower electrode including a perovskite material, an upper electrode spaced apart from the lower electrode, a dielectric layer positioned between the lower electrode and the upper electrode and including a perovskite material, and a passivation layer positioned between the lower electrode and the dielectric layer. The passivation layer includes $Sr_xTi_yO_3$ in which a content of Ti is greater than a content of Sr.

The content of Ti in the passivation layer may be 55% to 70%.

The lower electrode may include any one of $SrVO_3$, $SrMnO_3$, $SrCrO_3$, $SrFeO_3$, $SrCoO_3$ $SrRuO_3$, $SrMoO_3$, $SrIrO_3$, $SrNbO_3$, and $SrCoO_3$.

The lower electrode may have a crystalline structure.

The dielectric layer may include $SrTiO_3$.

The dielectric layer may have a crystalline structure.

The dielectric layer may include $SrTiO_3$ doped with at least one of Ba and Y.

A ratio of a thickness of the passivation layer to a total thickness of the dielectric layer and the passivation layer may be ½₀ to ⅕.

A total dielectric constant of the dielectric layer and the passivation layer may be in 60 to 80.

The upper electrode may include a perovskite material.

The upper electrode may include any one of $SrVO_3$, $SrMnO_3$, $SrCrO_3$, $SrFeO_3$, $SrCoO_3$ $SrRuO_3$, $SrMoO_3$, $SrIrO_3$, $SrNbO_3$, and $SrCoO_3$.

According to some example embodiments, an electronic device includes a transistor and the capacitor, the capacitor being electrically connected to the transistor.

The transistor may include a semiconductor substrate including a source region, a drain region, and a channel region between the source region and the drain region. The transistor may include gate stack arranged on the semiconductor substrate to face the channel region and including a gate insulating layer and a gate electrode.

According to some example embodiments, an electronic device includes a memory cell including the capacitor and the transistor, and a controller electrically connected to the memory cell and configured to control the memory cell.

According to some example embodiments, a method of fabricating a capacitor includes forming a lower electrode including a perovskite material on a substrate, forming a passivation layer including $Sr_xTi_yO_3$ in a perovskite material structure, wherein a concentration of Ti is greater than a concentration of Sr, on the lower electrode by using a first gas including Ti, a second gas including a hydroxyl group (OH), a third gas including an oxygen radical (O), and a fourth gas including Sr, forming a dielectric layer including a perovskite material on the passivation layer, and forming an upper electrode on the dielectric layer.

The forming of the passivation layer may include exposing the lower electrode to the first gas for a first time, sequentially exposing the lower electrode to the second gas for a second time and to the third gas for a third time after exposing the lower electrode to the first gas, exposing the lower electrode to the fourth gas for a fourth time after exposing the lower electrode to the second gas and the third gas, and exposing the lower electrode to the third gas for a fifth time after exposing the lower electrode to the fourth gas.

The second gas may include at least one of water ($H_2O$) and hydrogen peroxide ($H_2O_2$).

The third gas may include at least one of oxygen ($O_2$), ozone ($O_3$), and an oxygen radical (O).

The forming of the passivation layer may include an atomic layer deposition (ALD) operation.

The lower electrode and the upper electrode may each include any one of $SrVO_3$, $SrMnO_3$, $SrCrO_3$, $SrFeO_3$, $SrCoO_3SrRuO_3$, $SrMoO_3$, $SrIrO_3$, $SrNbO_3$, and $SrCoO_3$.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
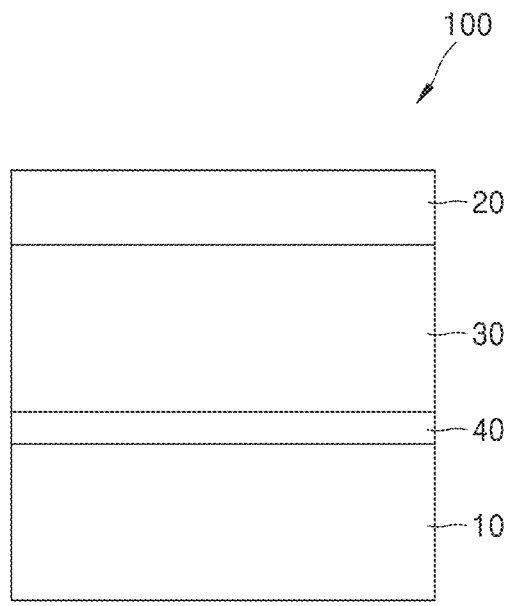
FIG. 1 schematically illustrates an example configuration of a capacitor according to some example embodiments.

Reference will now be made in detail to various embodiments, examples of which are illustrated in the accompanying drawings, wherein like reference numerals refer to like elements throughout. In this regard, various example embodiments may have different forms and should not be construed as being limited to the descriptions set forth herein. Accordingly, various example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, the size or thickness of each element may be exaggerated for clarity of description.

It will also be understood that when an element is referred to as being "on" or "above" another element, the element may be in direct contact with the other element or other intervening elements may be present. The singular forms include the plural forms unless the context clearly indicates otherwise.

Terms such as "first" or "second" may be used to describe various elements, but the elements should not be limited by the terms. These terms are only used to distinguish one element from another.

It should be understood that, when a part "comprises" or "includes" an element in the specification, unless otherwise defined, other elements are not excluded from the part and the part may further include other elements.

A perovskite material is a generic term for compounds in which a first cation is positioned at (0,0,0), a second cation is positioned at (1/2,1/2,1/2), and an anion is positioned at (1/2,1/2,0) in a unit cell. It is understood that a perovskite material includes not only those having an ideal symmetric structure of $CaTiO_3$, but also those having a warped structure having a lower symmetry than those mentioned above.

As a degree of integration of semiconductor devices is improved, improved physical properties of capacitors applied in semiconductor memory devices, which are one of semiconductor devices, are required. In particular, the demand for capacitors having high capacitance even in a small size of nanoscale is increasing. A capacitance is proportional to a dielectric constant of a dielectric layer included in a capacitor. Accordingly, research on a dielectric layer of a perovskite material having a high dielectric constant is being actively conducted.

Figure 2:
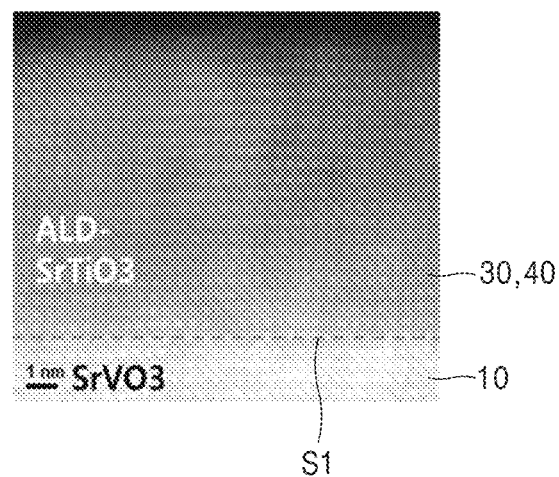
FIG. 2 is a transmission electron microscope (TEM) photo of a cross-section of the capacitor of FIG. 1.
Figure 3:
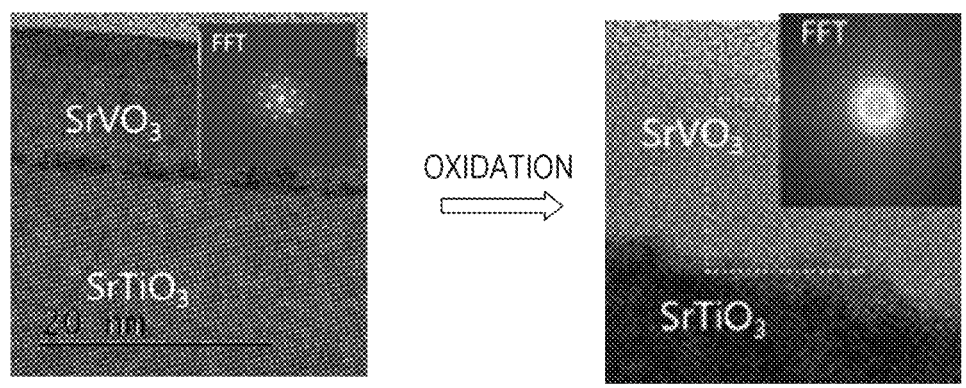
FIG. 3 is a TEM photo of a cross-section of a capacitor according to a comparative example.
Figure 4:
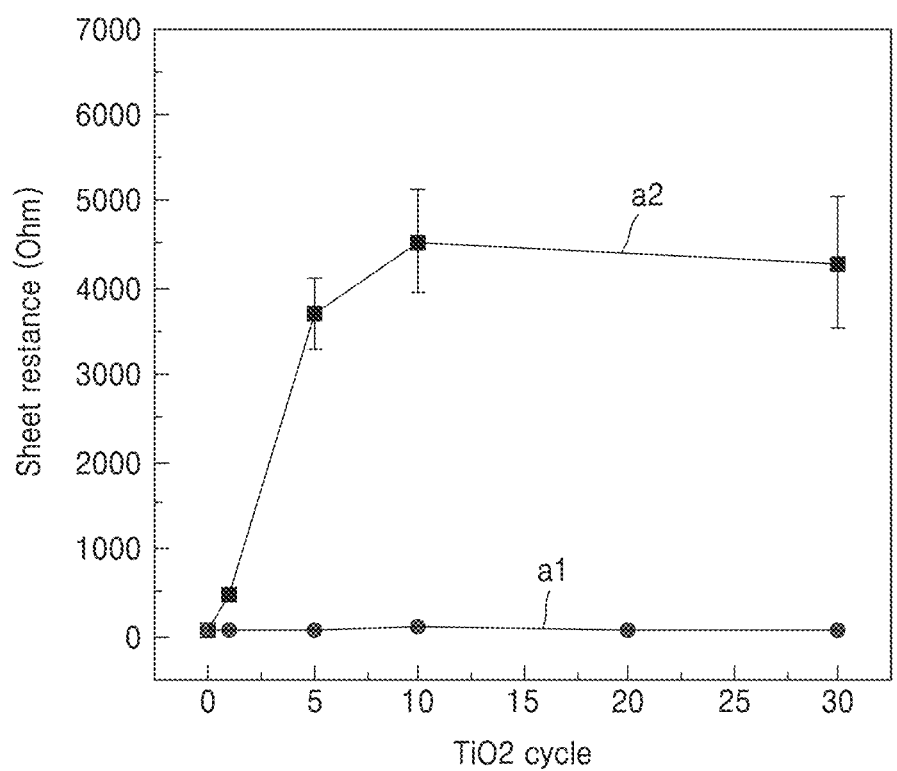
FIG. 4 is a graph showing a change, in a fabricating operation, in resistance of a lower electrode included in the capacitor of FIG. 1.

FIG. 1 schematically illustrates an example configuration of a capacitor 100 according to some example embodiments. FIG. 2 is a transmission electron microscope (TEM) photo of a cross-section of the capacitor 100 of FIG. 1. FIG. 3 is a TEM photo of a cross-section of a capacitor according to a comparative example. FIG. 4 is a graph showing a change in resistance of a lower electrode 10 included in the capacitor 100 of FIG. 1 in a fabricating operation.

Referring to FIG. 1, the capacitor 100 may include the lower electrode 10 including a perovskite material, an upper electrode 20 spaced apart from the lower electrode 10, a dielectric layer 30 positioned between the lower electrode 10 and the upper electrode 20 and including a perovskite material, and a passivation layer 40 positioned between the lower electrode 10 and the dielectric layer 30 and including $Sr_xTi_yO_3$ in which a content of Ti is greater than that of Sr.

The lower electrode 10 may include a perovskite material. For example, the lower electrode 10 may include any one of SRO, SIO, SVO, SNO, SCO, and SMO. SRO may include $SrRuO_3$. SIO may include $SrIrO_3$. SVO may include $SrVO_3$. SNO may include $SrNbO_3$. SCO may include $SrCoO_3$. SMO may include $SrMoO_3$. In addition, for example, the lower electrode 10 may include any one of $SrVO_3$, $SrMnO_3$, $SrCrO_3$, $SrFeO_3$, $SrCoO_3SrRuO_3$, $SrMoO_3$, $SrIrO_3$, $SrNbO_3$, and $SrCoO_3$.

Furthermore, the lower electrode 10 may have a crystalline structure, and accordingly, a sufficient conductivity of the lower electrode 10 to function as an electrode may be maintained.

Like the lower electrode 10, the upper electrode 20 may include a perovskite material. For example, the upper electrode 20 may include any one of SRO, SIO, SVO, SNO, SCO, and SMO. In addition, for example, the upper electrode 20 may include any one of $SrVO_3$, $SrMnO_3$, $SrCrO_3$, $SrFeO_3$, $SrCoO_3$$SrRuO_3$, $SrMoO_3$, $SrIrO_3$, $SrNbO_3$, and $SrCoO_3$. However, example embodiments are not limited thereto. Unlike the lower electrode 10, the upper electrode 20 may also include a conductive material other than the perovskite material.

Furthermore, the upper electrode 20 may have a crystalline structure, and accordingly, a sufficient conductivity of the upper electrode 20 to function as an electrode may be maintained.

The dielectric layer 30 may include a perovskite material. For example, the dielectric layer 30 may include $SrTiO_3$. When both the dielectric layer 30 and the upper electrode 20, which are in contact with each other, include a perovskite material, the dielectric layer 30 and the upper electrode 20 may show high mutual consistency with each other. In addition, the dielectric layer 30 may have a crystalline structure, and accordingly, a high dielectric constant of the dielectric layer 30 may be maintained or more easily maintained.

Furthermore, the dielectric layer 30 may include $SrTiO_3$ doped with at least one of Ba and Y. As such, the dielectric constant of the dielectric layer 30 may be increased compared to that before doping of impurities by including a structure in which $SrTiO_3$ is doped with impurities such as Ba, Y, or the like. However, the present disclosure is not limited thereto. The dielectric layer 30 may include $SrTiO_3$ doped with various types of impurities other than Ba and Y.

The passivation layer 40 may include a perovskite material. For example, the passivation layer 40 may include $Sr_xTi_yO_3$ in which a content of Ti is greater than that of Sr. For example, when the passivation layer 40 includes $Sr_xTi_yO_3$, the content of Ti of the passivation layer 40 may be about 55% to about 70%. In other words, the content of Ti relative to a total content of Sr and Ti of the passivation layer 40 may be about 55% to about 70%. However, example embodiments are not limited thereto, and the content of Ti of the passivation layer 40 may also be greater than 70%. In this case, the passivation layer 40 may include $Sr_xTi_yO_3$ including y having a greater value than x.

As such, because the passivation layer 40 includes a perovskite material, the passivation layer 40 may show high mutual consistency with the lower electrode 10 including a perovskite material or the dielectric layer 30 including a perovskite material. As such, because the passivation layer 40 shows high mutual consistency with the dielectric layer 30 and the lower electrode 10 respectively provided on and below the passivation layer 40, the crystallinity of the lower electrode 10 and the dielectric layer 30 may be improved. In this case, both the lower electrode 10 and the dielectric layer 30 may have a crystalline structure.

The passivation layer 40 may be formed through an atomic layer deposition (ALD) operation. For example, as shown in FIG. 2, the passivation layer 40 and the dielectric layer 30, which both include $SrTiO_3$, may be sequentially stacked on the lower electrode 10 including $SrVO_3$ through an ALD operation. The passivation layer 40 may include $SrTiO_3$, wherein a content of Ti is greater than that of Sr. In this case, it may be known that the mutual consistency at an interface S1 between the lower electrode 10 and the passivation layer 40 is high. This is because, when the dielectric layer 30 is formed on the lower electrode 10 in the ALD operation, the passivation layer 40 including $SrTiO_3$, wherein a content of Ti is greater than that of Sr, may prevent or reduce the likelihood of and/or impact from the lower electrode 10 from being oxidized in a high-temperature atmosphere.

Alternatively, referring to FIG. 3, a capacitor according to a comparative example may include a structure in which an electrode including $SrVO_3$ and a dielectric layer including $SrTiO_3$ contact each other without including a separate passivation layer. In this case, when the dielectric layer is formed on the electrode through an ALD operation, the electrode may be oxidized in a high-temperature atmosphere, and the crystallinity of the electrode may be deteriorated. Accordingly, mutual consistency between the electrode and the dielectric layer included in the capacitor according to a comparative example may be deteriorated, and thus a dielectric constant of the dielectric layer may decrease.

A ratio of a thickness of the passivation layer 40 to a total thickness of the dielectric layer 30 and the passivation layer 40 may be about 1/20 to about 1/5. For example, the ratio of the thickness of the passivation layer 40 to the total thickness of the dielectric layer 30 and the passivation layer 40 may be 1/10. In this case, the total thickness of the dielectric layer 30 and the passivation layer 40 may be about 10 nm, and the thickness of the passivation layer 40 may be about 1 nm. However, example embodiments are not limited thereto. The ratio of the thickness of the passivation layer 40 to the total thickness of the dielectric layer 30 and the passivation layer 40 may have any value within about 1/20 to about 1/5.

In addition, a total dielectric constant of the dielectric layer 30 and the passivation layer 40 may be about 60 to about 80. For example, the total dielectric constant of the dielectric layer 30 and the passivation layer 40 may be 68. However, example embodiments are not limited thereto. The total dielectric constant of the dielectric layer 30 and the passivation layer 40 may be greater than 80 depending on external factors such as improvement in process precision or the like.

Furthermore, as shown in a first curve a1 of FIG. 4, even when a generation cycle of $TiO_2$ for forming the dielectric layer 30 is repeated, a resistance of the lower electrode 10 may be maintained close to '0'. For example, as shown in a second curve a1 of FIG. 4, in an ALD operation for forming the dielectric layer 30, a reaction gas for generating $TiO_2$ may be periodically supplied into a reaction chamber, and even after the generation cycle of $TiO_2$ is repeated up to 30 times, the resistance of the lower electrode 10 may not significantly change from an initial value.

However, unlike this, as shown in a second curve a2 of FIG. 4, when a generation cycle of $TiO_2$ for generating a dielectric layer of a capacitor according to a comparative example which does not include the passivation layer 40, the resistance of a lower electrode may be greatly increased. For example, when there are five generation cycles of $TiO_2$ in an operation of forming the dielectric layer of the capacitor according to the comparative example, the resistance of the lower electrode is about 3800Ω (Ohms), when there are ten generation cycles, the resistance of the lower electrode is about 4500Ω (Ohms), and when there are thirty generation cycles, the resistance of the lower electrode is about 4200Ω (Ohms).

Figure 5:
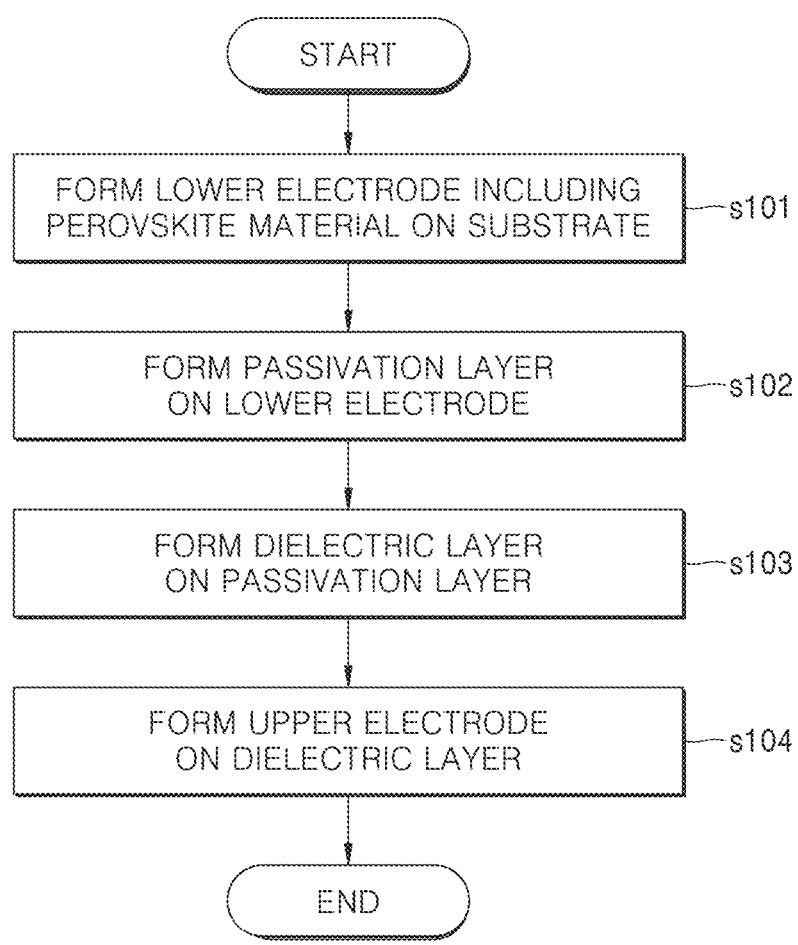
FIG. 5 is a flowchart of a method of fabricating a capacitor according to some example embodiments.
Figure 6:
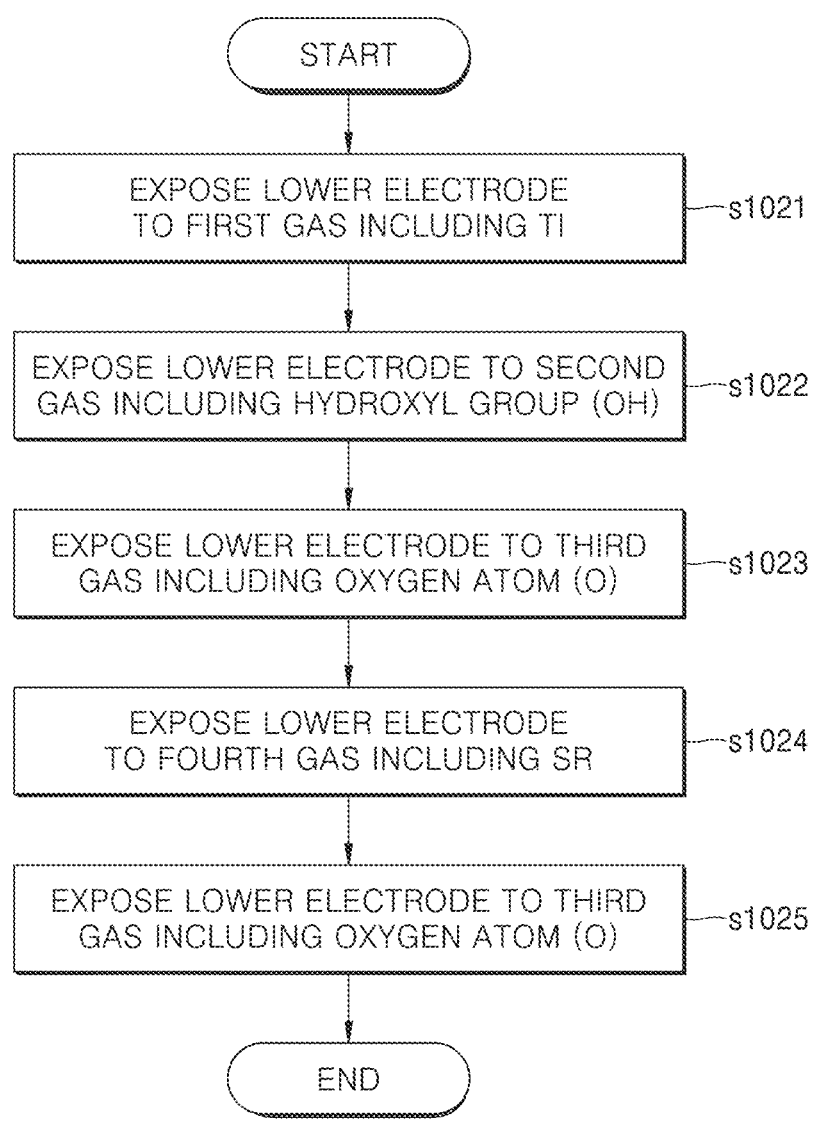
FIG. 6 is a flowchart illustrating an operation of forming a passivation layer included in the method of fabricating a capacitor of FIG. 5.
Figure 7:
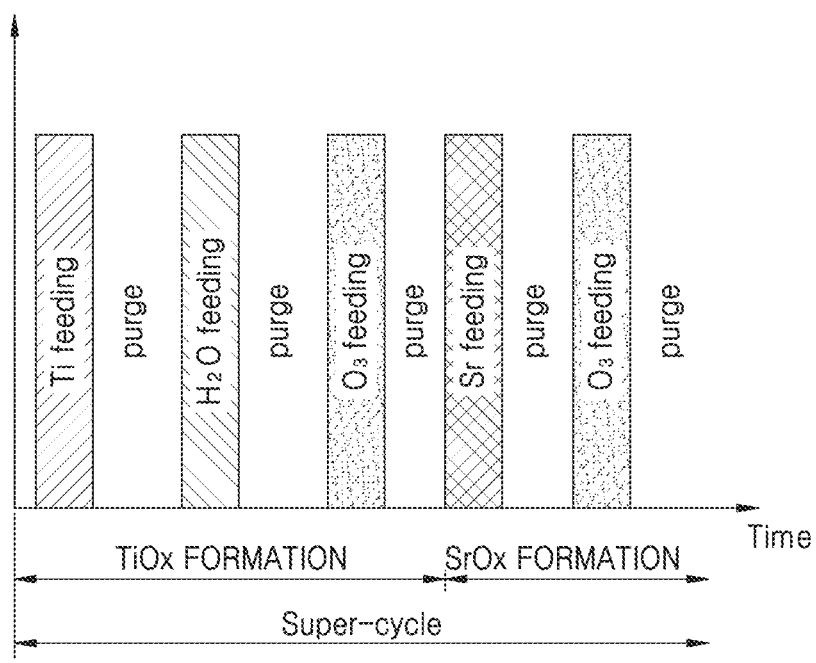
FIG. 7 is a graph for explaining the operation of forming a passivation layer of FIG. 6.
Figure 8:
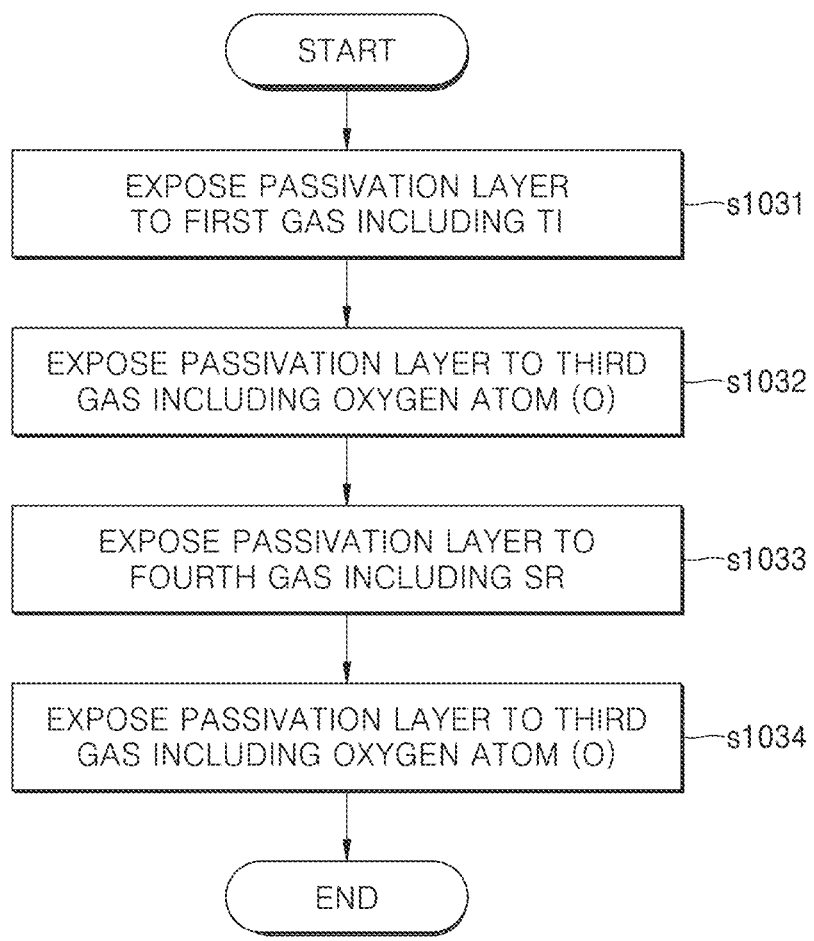
FIG. 8 is a flowchart illustrating an operation of forming a dielectric layer in the method of fabricating a capacitor of FIG. 5.
Figure 9:
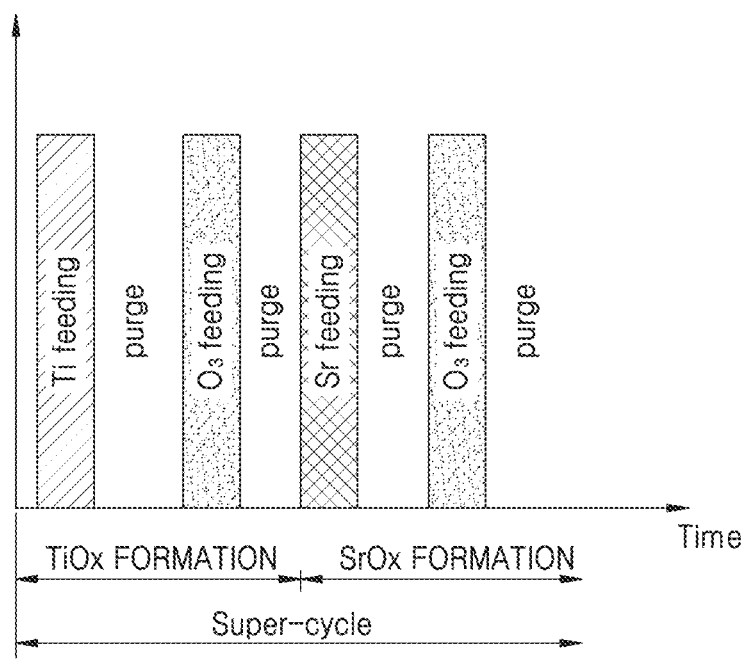
FIG. 9 is a graph for explaining the operation of forming a dielectric layer of FIG. 8.

FIG. 5 is a flowchart of a method of fabricating a capacitor according to some example embodiments. FIG. 6 is a flowchart illustrating operation s102 of forming a passivation layer included in the method of fabricating a capacitor of FIG. 5. FIG. 7 is a graph for explaining operation s102 of forming a passivation layer of FIG. 6. FIG. 8 is a flowchart illustrating operation s103 of forming a dielectric layer included in the method of fabricating a capacitor of FIG. 5. FIG. 9 is a graph for explaining operation s103 of forming a dielectric layer of FIG. 8.

FIGS. 5 to 9 are described with reference to a configuration of the capacitor 100 of FIG. 1.

Referring to FIG. 5, a method of fabricating a capacitor according to some example embodiments may include operation s101 of forming the lower electrode 10 including a perovskite material, operation s102 of forming the passivation layer 40 on the lower electrode 10, operation s103 of forming the dielectric layer 30 on the passivation layer 40, and operation s104 of forming the upper electrode 20 on the dielectric layer 30. The method of fabricating a capacitor according to some example embodiments may be performed through an ALD operation.

In operation s101 of forming the lower electrode 10, the lower electrode 10 may be formed on a substrate through a pulsed laser deposition (PLD) operation. The lower electrode 10 may include a perovskite material. For example, the lower electrode 10 may include any one of SRO, SIO, SVO, SNO, SCO, and SMO. SRO may include $SrRuO_3$. SIO may include $SrIrO_3$. SVO may include $SrVO_3$. SNO may include $SrNbO_3$. SCO may include $SrCoO_3$. SMO may include $SrMoO_3$. In addition, for example, the lower electrode 10 may include any one of $SrVO_3$, $SrMnO_3$, $SrCrO_3$, $SrFeO_3$, $SrCoO_3 SrRuO_3$, $SrMoO_3$, $SrIrO_3$, $SrNbO_3$, and $SrCoO_3$.

In this case, similar to the lower electrode 10, the substrate may include a perovskite material. Accordingly, the substrate and the lower electrode 10 may show high mutual consistency with each other, and the lower electrode 10 formed on the substrate may have a crystalline structure.

In operation s102 of forming the passivation layer 40, the passivation layer 40 may be formed on the lower electrode 10 through an ALD operation. The passivation layer 40 may include a perovskite material. For example, the passivation layer 40 may include $Sr_xTi_yO_3$, wherein a content of Ti is greater than that of Sr. For example, when the passivation layer 40 includes $Sr_xTi_yO_3$, the content of Ti of the passivation layer 40 may be about 55% to about 70%. However, example embodiments are not limited thereto, and the content of Ti of the passivation layer 40 may also be greater than 70%.

Operation s102 of forming the passivation layer 40 may include forming, on the lower electrode 10, the passivation layer 40 including $Sr_xTi_yO_3$ in a perovskite material structure, wherein a concentration of Ti is greater than a concentration of Si by using a first gas including Ti, a second gas including a hydroxyl group (OH), a third gas including an oxygen radical (O), and a fourth gas including Sr.

For example, referring to FIGS. 6 and 7, operation s102 of forming the passivation layer 40 may include operation s1021 of exposing the lower electrode 10 to the first gas including Ti, operation s1022 of exposing the lower electrode 10 to the second gas including a hydroxyl group (OH), operation s1023 of exposing the lower electrode 10 to the third gas including an oxygen radical (O), operation s1024 of exposing the lower electrode 10 to the fourth gas including Sr, and operation s1025 of exposing the lower electrode 10 to the third gas including an oxygen radical (O).

In addition, a purge operation may be included between operation s1021 of exposing the lower electrode 10 to the first gas including Ti and operation s1022 of exposing the lower electrode 10 to the second gas including a hydroxyl group (OH), between operation s1022 and operation s1023 of exposing the lower electrode 10 to the third gas including an oxygen radical (O), between operation s1023 and operation s1024 of exposing the lower electrode 10 to the fourth gas including Sr, between operation s1024 and operation s1025 of exposing the lower electrode 10 to the third gas including an oxygen radical (O).

Operation s1021 of exposing the lower electrode 10 to the first gas including Ti, operation s1022 of exposing the lower electrode 10 to the second gas including a hydroxyl group (OH), and operation s1023 of exposing the lower electrode 10 to the third gas including an oxygen radical (O) may be operations of forming $TiO_x$ on the lower electrode 10. In addition, operation s1024 of exposing the lower electrode 10 to the fourth gas including Sr and operation s1025 of exposing the lower electrode 10 to the third gas including an oxygen radical (O) may be operations of forming $SrO_x$ on the lower electrode 10.

The passivation layer 40 may be formed on the lower electrode 10 by repeatedly performing all of operation s1021 of exposing the lower electrode 10 to the first gas including Ti, operation s1022 of exposing the lower electrode 10 to the second gas including a hydroxyl group (OH), operation s1023 of exposing the lower electrode 10 to the third gas including an oxygen radical (O), operation s1024 of exposing the lower electrode 10 to the fourth gas including Sr, and operation s1025 of exposing the lower electrode 10 to the third gas including an oxygen radical (O).

In operation s1021 of exposing the lower electrode 10 to the first gas including Ti, the lower electrode 10 may be exposed to the first gas for a first time. In this case, various types of Ti precursors may be included in the first gas.

In operation s1022 of exposing the lower electrode 10 to the second gas including a hydroxyl group (OH), the lower electrode 10 may be exposed to the second gas for a second time. The second gas may include at least one of water ($H_2O$) (water steam) and hydrogen peroxide ($H_2O_2$).

In operation s1023 of exposing the lower electrode 10 to the third gas including an oxygen radical (O), the lower electrode 10 may be exposed to the third gas for a third time. The third gas may include at least one of oxygen ($O_2$), ozone ($O_3$), and an oxygen radical (O).

Operation s1022 of exposing the lower electrode 10 to the second gas including a hydroxyl group (OH) and operation s1023 of exposing the lower electrode 10 to the third gas including an oxygen radical (O) may be sequentially performed after the lower electrode 10 is exposed to the first gas.

In this way, a Ti precursor may be adsorbed on the lower electrode 10 during the ALD operation of exposing the lower electrode 10 to the first gas, the second gas, and the third gas, and in this operation, a Ti—O binder may be formed on the lower electrode 10. The Ti—O binder may react with Sr included in the fourth gas to be supplied later, and accordingly, the passivation layer 40 including $Sr_xTi_yO_3$ having a passivation function to prevent or reduce the likelihood of and/or impact from the lower electrode 10 from being exposed to the outside may be formed. At the same time, various types of ligand binders may be formed on the lower electrode 10. The various types of ligand binders scattered on the lower electrode 10 may have a property of being decomposed by an $O_3$ gas), and when the ligand binders are decomposed, an upper surface of the lower electrode 10 may be exposed to the outside.

However, for example, when the lower electrode 10 is exposed to the second gas including water ($H_2O$), the various types of ligand binders scattered on the lower electrode 10 may be converted into a Ti—O binder by the water ($H_2O$), and the Ti—O binder may not be decomposed by an $O_3$ gas), and thus, an area in which the upper surface of the lower electrode 10 is exposed to the outside may be minimized. As such, when the lower electrode 10 is exposed to the first gas including Ti and the third gas including ozone ($O_3$) together with the second gas including water ($H_2O$), the Ti—O binder that is not decomposed by an $O_3$ gas) may be actively generated on the lower electrode 10.

In operation s1024 of exposing the lower electrode 10 to the fourth gas including Sr, the lower electrode 10 may be exposed to the fourth gas for a fourth time. In this case, various types of Sr precursors may be included in the fourth gas.

In operation s1025 of exposing the lower electrode 10 to the third gas including an oxygen radical (O), the lower electrode 10 may be exposed to the third gas for a fifth time. The third gas may include at least one of oxygen ($O_2$), ozone ($O_3$), and an oxygen radical (O).

Operation s1024 of exposing the lower electrode 10 to the fourth gas including Sr and operation s1025 of exposing the lower electrode 10 to the third gas including an oxygen radical (O) may be sequentially performed after the lower electrode 10 is exposed to the first gas, the second gas, and the third gas.

In operation s103 of forming the dielectric layer 30, the dielectric layer 30 may be formed on the passivation layer 40 through an ALD operation. The dielectric layer 30 may include a perovskite material. For example, the dielectric layer 30 may include $SrTiO_3$. The dielectric layer 30 may have a crystalline structure, and accordingly, a high dielectric constant of the dielectric layer 30 may be secured. Furthermore, the dielectric layer 30 may include $SrTiO_3$ doped with or having incorporated therein at least one of Ba and Y. In this way, the dielectric constant of the dielectric layer 30 may be increased by including a structure in which $SrTiO_3$ is doped with impurities such as Ba and Y. However, example embodiments are not limited thereto. The dielectric layer 30 may include $SrTiO_3$ doped with various types of impurities other than Ba and Y.

Operation s103 of forming the dielectric layer 30 may include forming the dielectric layer 30 including $SrTiO_3$ in a perovskite material structure on the passivation layer 40 by using the first gas including Ti, the third gas including an oxygen radical (O), and the fourth gas including Sr.

For example, referring to FIGS. 8 and 9, operation s103 of forming the dielectric layer 30 may include operation s1031 of exposing the passivation layer 40 to the first gas including Ti, operation s1032 of exposing the passivation layer 40 to the third gas including an oxygen radical (O), operation s1033 of exposing the passivation layer 40 to the fourth gas including Sr, and operation s1034 of exposing the passivation layer 40 to the third gas including an oxygen radical (O).

Operation s103 of forming the dielectric layer 30 may form the dielectric layer 30 on the passivation layer 40 by repeatedly performing all of operation s1031 of exposing the passivation layer 40 to the first gas including Ti, operation s1032 of exposing the passivation layer 40 to the third gas including an oxygen radical (O), operation s1033 of exposing the passivation layer 40 to the fourth gas including Sr, and operation s1034 of exposing the passivation layer 40 to the third gas including an oxygen radical (O).

In operation s103 of forming the dielectric layer 30, unlike operation s102 of forming the passivation layer 40, an operation of exposing the passivation layer 40 to the second gas including a hydroxyl group (OH) is not included. Accordingly, in operation s103 of forming the dielectric layer 30, fewer Ti—O binders may be generated compared to operation s102 of forming the passivation layer 40. Hence, a content of Ti of the dielectric layer 30 may be lower than a content of Ti of the passivation layer 40.

In operation s104 of forming the upper electrode 20, the upper electrode 20 may be formed on the dielectric layer 30 through an ALD operation. The upper electrode 20 may include a perovskite material. For example, the upper electrode 20 may include any one of or at least one of SRO, SIO, SVO, SNO, SCO, and SMO. SRO may include $SrRuO_3$. SIO may include $SrIrO_3$. SVO may include $SrVO_3$. SNO may include $SrNbO_3$. SCO may include $SrCoO_3$. SMO may include $SrMoO_3$. In addition, for example, the upper electrode 20 may include any one of or at least one of $SrVO_3$, $SrMnO_3$, $SrCrO_3$, $SrFeO_3$, $SrCoO_3SrRuO_3$, $SrMoO_3$, $SrIrO_3$, $SrNbO_3$, and $SrCoO_3$.

Figure 10:
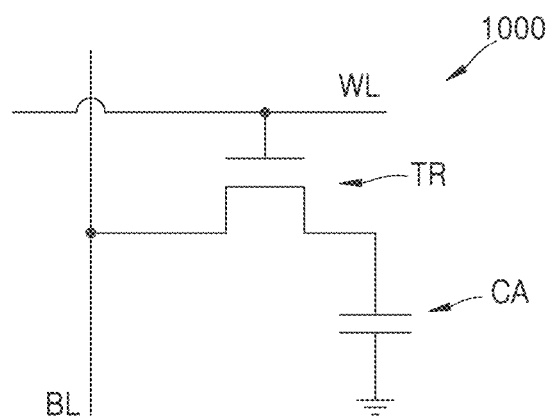
FIG. 10 is a circuit diagram illustrating a schematic circuit configuration and an operation of an electronic device including a capacitor according to some example embodiments.

FIG. 10 is a circuit diagram illustrating a schematic circuit configuration and an operation of an electronic device 1000 including a capacitor according to embodiments.

The circuit diagram of the electronic device 1000 is with respect to one cell of a dynamic random access memory (DRAM) device, and includes one transistor TR, one capacitor CA, a word line WL, and a bit line BL. The capacitor CA may be the capacitor 100 described with reference to FIGS. 1 to 9. The transistor TR may be an NMOS transistor; however, example embodiments are not limited thereto.

A method of writing data to DRAM is as follows. After applying a gate voltage (high) for turning the transistor TR into an 'ON' state to a gate electrode through the word line WL, VDD (high) or 0 (low), which is a data voltage value to be input, is applied to the bit line BL. When a high voltage is applied to the word line WL and the bit line BL, the capacitor CA is charged and data such as logic "1" is recorded, and when a high voltage is applied to the word line WL and a low voltage is applied the bit line BL, the capacitor CA is discharged and data such as logic "0" is recorded.

When reading data, a voltage of VDD/2 is applied to the bit line BL after applying a high voltage to the word line WL to turn on the transistor TR of the DRAM. When data of the DRAM is "1", that is, when a voltage of the capacitor CA is VDD, a voltage of the bit line BL becomes slightly greater than VDD/2 as charges in the capacitor CA slowly move to the bit line BL. On the other hand, when data of the capacitor CA is "0", charges of the bit line BL move to the capacitor CA, and thus, the voltage of the bit line BL becomes slightly lower than VDD/2. A sense amplifier may sense a potential difference of a bit line generated in this way and amplify a value to determine whether corresponding data is "0" or "1".

Figure 11:
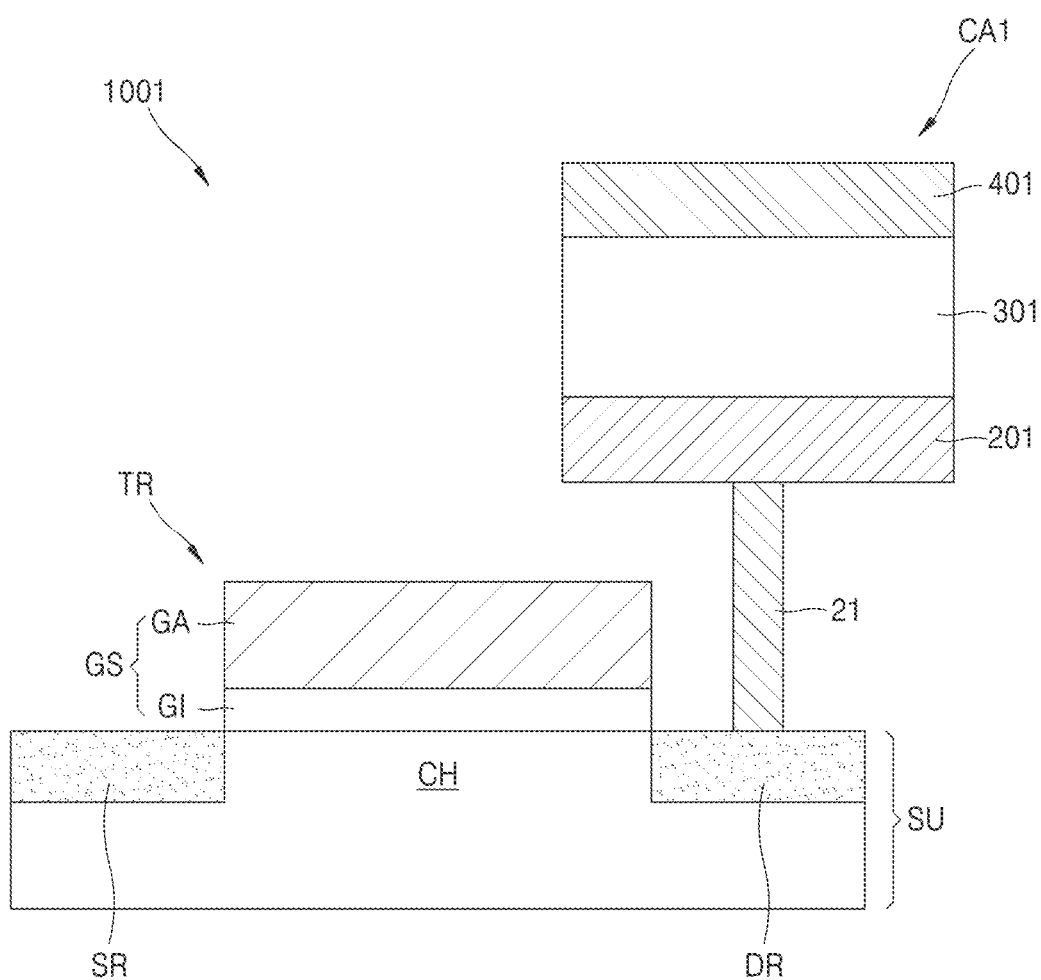
FIG. 11 is a schematic diagram of an electronic device according to some example embodiments.

FIG. 11 is a schematic diagram of an electronic device 1001 according to some example embodiments.

Referring to FIG. 11, the electronic device 1001 may include a structure in which a capacitor CA1 and a transistor TR are electrically connected by a contact 21. The capacitor CA1 may include a lower electrode 201, an upper electrode 401, and a dielectric thin film 301 between the lower electrode 201 and the upper electrode 401. The capacitor CA1 may be the capacitor 100 as described with reference to FIGS. 1 to 9. In this case, the dielectric thin film 301 may correspond to a structure in which the dielectric layer 30 and the passivation layer 40 of FIG. 1 are stacked.

The transistor TR may be or may include a field-effect transistor. The transistor TR may include a semiconductor substrate SU and a gate stack GS, wherein the semiconductor substrate SU includes a source region SR, a drain region DR, and a channel region CH, and the gate stack GS is arranged on the semiconductor substrate SU to face the channel region CH and includes a gate insulating layer GI and a gate electrode GA.

The channel region CH is a region between the source region SR and the drain region DR, and is electrically connected to the source region SR and the drain region DR. The source region SR may be electrically connected to or contacted with one end portion of the channel region CH, and the drain region DR may be electrically connected to or contacted with the other end of the channel region CH. The channel region CH may be defined as a substrate region between the source region SR and the drain region DR in the semiconductor substrate SU.

The semiconductor substrate SU may include a semiconductor material. The semiconductor substrate SU may include, for example, a semiconductor material such as one or more of silicon (Si), germanium (Ge), silicon germanium (SiGe), silicon carbide (SiC), gallium arsenide (GaAs), indium arsenide (InAs), indium phosphide (InP), or the like. In addition, the semiconductor substrate SU may also include a silicon-on-insulation (SOI).

The source region SR, the drain region DR, and the channel region CH may be independently formed by injecting or implanting impurities, such as at least one of boron, phosphorus, or arsenic, into different regions of the semiconductor substrate SU, respectively. In this case, the source region SR, the channel region CH, and the drain region DR may each include a substrate material as a base material. The source region SR and the drain region DR may include a conductive material, and in this case, the source region SR and the drain region DR may include, for example, one or more of a metal, a metal compound, or a conductive polymer.

The channel region CH may also be implemented as a separate material layer (thin film), unlike that being illustrated in FIG. 11. In this case, for example, the channel region CH may include at least one of Si, Ge, SiGe, a Group III-V semiconductor, an oxide semiconductor, a nitride semiconductor, an oxynitride semiconductor, a two-dimensional (2D) material, a quantum dot (QD), and an organic semiconductor. For example, the oxide semiconductor may include InGaZnO or the like, the 2D material may include a transition metal dichalcogenide (TMD) or graphene, and the QD may include a colloidal QD or a nanocrystal structure.

The gate electrode GA may be arranged above the semiconductor substrate SU to be spaced apart from the semiconductor substrate SU and face the channel region CH. The gate electrode GA may include at least one of a metal, a metal nitride film, a metal carbide, and polysilicon. For example, the metal may include at least one of aluminum (Al), tungsten (W), molybdenum (Mo), titanium (Ti), and tantalum (Ta), and the metal nitride film may include at least one of a titanium nitride (TiN) film and a tantalum nitride (TaN) film. The metal carbide may include at least one of metal carbides doped with (or containing or having incorporated therein) Al and Si, and particular examples thereof may include TiAlC, TaAlC, TiSiC or TaSiC.

The gate electrode GA may have a structure in which a plurality of materials are stacked, and may for example, may have a stacked structure of metal nitride layer/metal layer, such as TiN/Al, or a stacked structure of metal nitride layer/metal carbide layer/metal layer, such as TiN/TiAlC/W. However, the materials mentioned above are merely examples.

The gate insulating layer GI may be further arranged between the semiconductor substrate SU and the gate electrode GA. The gate insulating layer GI may include a paraelectric material or a high-k dielectric material, and may have a dielectric constant of about 20 to about 70.

The gate insulating layer GI may include silicon oxide, silicon nitride, aluminum oxide, hafnium oxide, zirconium oxide, or the like, or may include a 2D insulator such as a hexagonal boron nitride (h-BN). For example, the gate insulating layer GI may include silicon oxide ($SiO_2$), silicon nitride ($SiN_x$), or the like, and may include hafnium oxide ($HfO_2$), hafnium silicon oxide ($HfSiO_4$), lanthanum oxide ($La_2O_3$), lanthanum aluminum oxide ($LaAlO_3$), zirconium oxide ($ZrO_2$), hafnium zirconium oxide ($HfZrO_2$), zirconium silicon oxide ($ZrSiO_4$), tantalum oxide ($Ta_2O_5$), titanium oxide ($TiO_2$), strontium titanium oxide ($SrTiO_3$), yttrium oxide ($Y_2O_3$), aluminum oxide ($Al_2O_3$), red scandium tantalum oxide ($PbSc_{0.5}Ta_{0.5}O_3$), red zinc niobate ($PbZnNbO_3$), or the like. In addition, the gate insulating layer GI may also include a metal nitride oxide such as aluminum oxynitride (AlON), zirconium oxynitride (ZrON), hafnium oxynitride (HfON), lanthanum oxynitride (LaON), yttrium oxynitride (YON), or the like, a silicate such as ZrSiON, HfSiON, YSiON, LaSiON, or the like, or an aluminate such as one or more of ZrAlON, HfAlON, or the like. The gate insulating layer GI may form a gate stack together with the gate electrode GA.

One of the lower and upper electrodes 201 and 401 of the capacitor CA1 and one of the source region SR and the drain region DR of the transistor TR may be electrically connected to each other by the contact 21. Here, the contact 21 may include one or more conductive materials, such as for example, W, copper, Al, polysilicon, or the like.

An arrangement of the capacitor CA1 and the transistor TR may be variously modified. For example, the capacitor CA1 may be arranged on the semiconductor substrate SU, or may have a structure embedded in the semiconductor substrate SU.

FIG. 11 illustrates the electronic device 1001 including one capacitor CA1 and one transistor TR, but this is an example. The electronic device 1001 may include a plurality of capacitors and a plurality of transistors. There may be more than one capacitor per transistor, or there may be more than one transistor per capacitor; example embodiments are not limited thereto.

Figure 12:
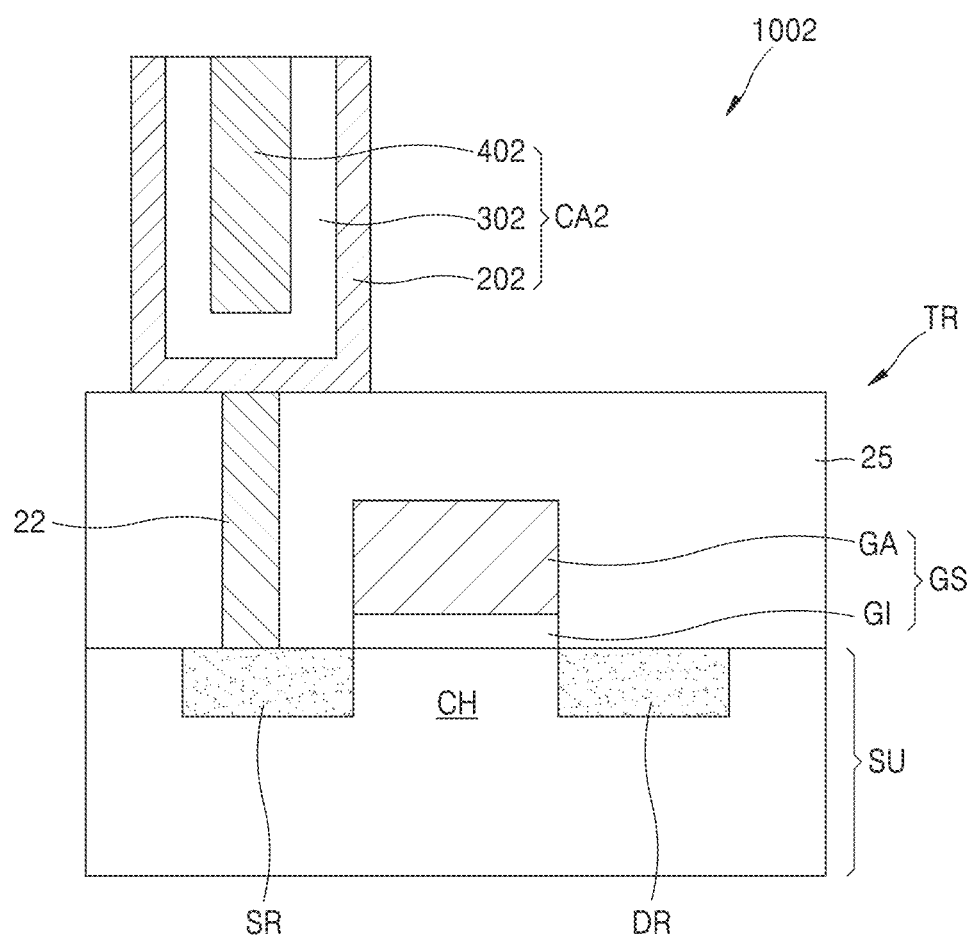
FIG. 12 illustrates an electronic device according to some example embodiments.

FIG. 12 illustrates an electronic device 1002 according to some example embodiments.

Referring to FIG. 12, the electronic device 1002 may include a structure such as a memory cell in which a capacitor CA2 and a transistor TR are electrically connected to each other by a contact 22.

The transistor TR may be planar, or may be three-dimension. The transistor TR may include a semiconductor substrate SU and a gate stack GS, wherein the semiconductor substrate SU includes a source region SR, a drain region DR, and a channel region CH, and the gate stack GS is arranged on the semiconductor substrate SU to face the channel region CH and includes a gate insulating layer GI and a gate electrode GA.

An interlayer insulating film 25 may be provided on the semiconductor substrate SU to cover the gate stack GS. The interlayer insulating film 25 may include an insulating material. For example, the interlayer insulating film 25 may include one or more of a Si oxide (e.g., $SiO_2$), an Al oxide (e.g., $Al_2O_3$), or a high-k dielectric material (e.g., $HfO_2$). The contact 22 passes through the interlayer insulating film 25 to electrically connect the transistor TR to the capacitor CA1.

The capacitor CA1 includes a lower electrode 202, an upper electrode 402, and a dielectric thin film 302 between the lower electrode 202 and the upper electrode 402. The lower electrode 202 and the upper electrode 402 are presented in a shape that may maximize a contact area with the dielectric thin film 302 and a material of the capacitor CA2 is substantially the same as the capacitor 100 as described with reference to FIGS. 1 to 9. In this case, the dielectric thin film 302 may correspond to a structure in which the dielectric layer 30 and the passivation layer 40 of FIG. 1 are stacked.

Figure 13:
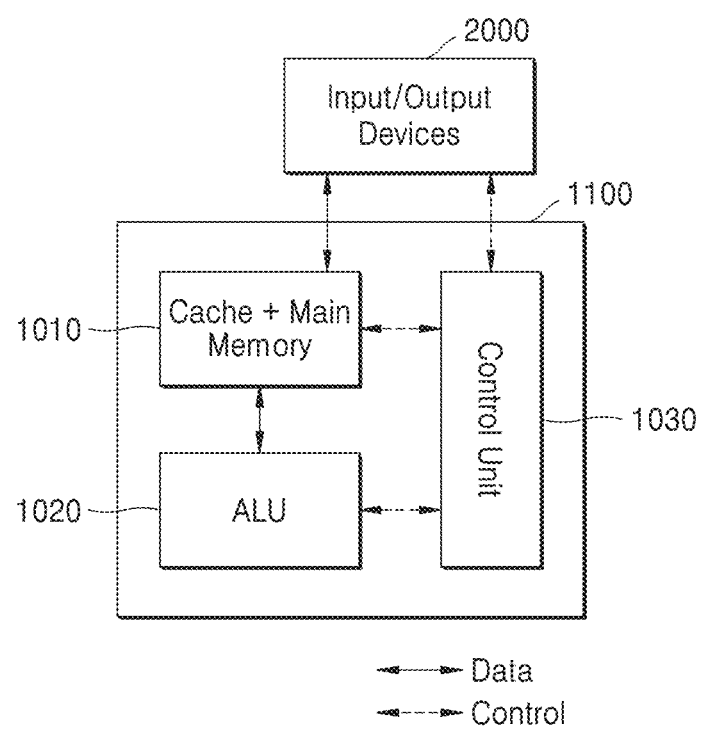
FIGS. 13 and 14 are conceptual diagrams each schematically showing a device architecture that may be used in a device according to some example embodiments.
Figure 14:
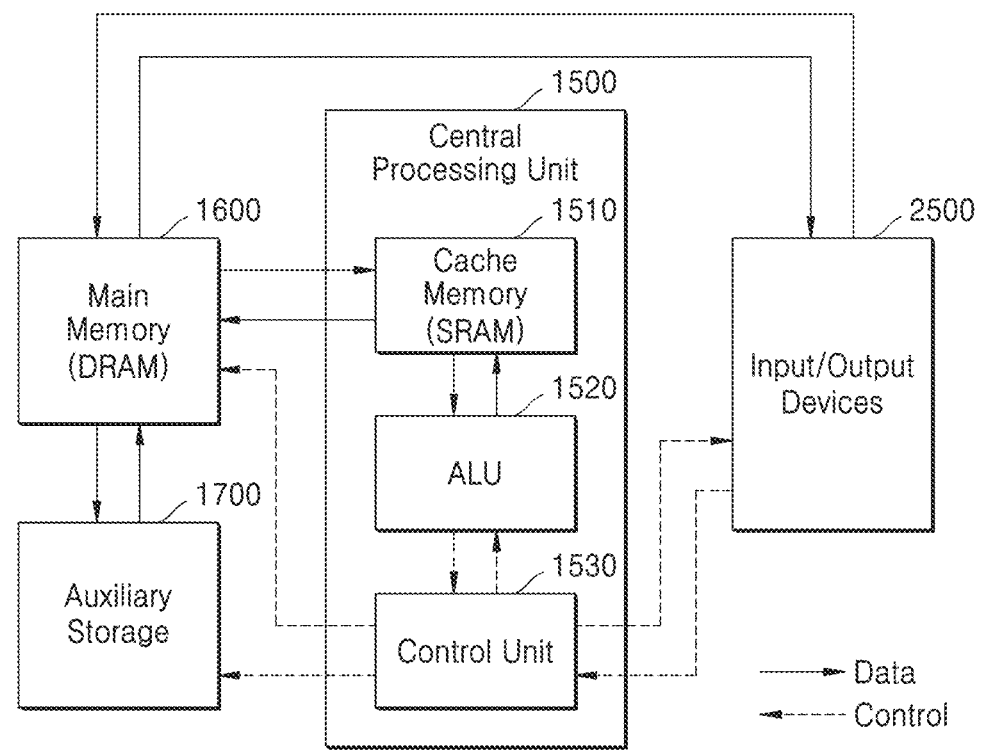

FIGS. 13 and 14 are conceptual diagrams each schematically showing a device architecture that may be used in a device according to an example embodiment.

Referring to FIG. 13, an electronic device architecture 1100 may include a memory unit 1010, an arithmetic logic unit (ALU) 1020, and a control unit 1030. The memory unit 1010, the ALU 1020, and the control unit 1030 may be electrically connected to each other. For example, the electronic device architecture 1100 may be implemented as a single chip including the memory unit 1010, the ALU 1020, and the control unit 1030.

The memory unit 1010, the ALU 1020, and the control unit 1030 may be interconnected, for example through a metal line in an on-chip to communicate or directly communicate with each other. The memory unit 1010, the ALU 1020, and the control unit 1030 may also be monolithically integrated on one substrate to configure a single chip. Input/output devices 2000 may be connected to the electronic device architecture 1100. In addition, the memory unit 1010 may include both a main memory and a cache memory. The electronic device architecture 1100 may be an on-chip memory processing unit. The memory unit 1010 may include the capacitor 100 described with reference to FIGS. 1 to 9 and the electronic devices 1001 and 1002 including the capacitor 100 described with reference to FIGS. 11 and 12. The ALU 1020 or the control unit 1030 may each include the capacitor 100 described with reference to FIGS. 1 to 9 and the electronic devices 1001 and 1002 including the capacitor 100 described with reference to FIGS. 11 and 12.

Referring to FIG. 14, a cache memory 1510, an ALU 1520, and a control unit 1530 may configure a central processing unit (CPU) 1500, and the cache memory 1510 may include static random access memory (SRAM). Separately from the CPU 1500, a main memory 1600 and an auxiliary storage 1700 may be provided. The main memory 1600 may be or may include dynamic random access memory (DRAM) and may include the capacitor 100 described above. In some cases, an electronic device architecture may be implemented in a form in which computing unit devices and memory unit/memory cell devices are adjacent to each other in a single chip without distinction of sub-units.

According to various example embodiments, a capacitor including a lower electrode including a perovskite material and a dielectric layer including $SrTiO_3$, a method of fabricating the capacitor, and/or an electronic device including the capacitor may be provided.

According to various example embodiments, a capacitor in which a lower electrode may be prevented from, or reduced in likelihood of and/or impact from, being oxidized in an operation of forming a dielectric layer by including a Ti-rich passivation layer between the lower electrode including a perovskite material and the dielectric layer including $SrTiO_3$, a method of fabricating the capacitor, and/or an electronic device including the capacitor may be provided.

According to various example embodiments, oxidation of a lower electrode that may occur during an operation of forming a dielectric layer may be prevented or reduced with a Ti-rich passivation layer formed between the lower electrode including a perovskite material and the dielectric layer including $SrTiO_3$ by using a $H_2O$ gas and an $O_3$ gas).

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

It should be understood that various example embodiments described herein should be considered in a descriptive sense only and not for purposes of limitation. Descriptions of features or aspects within each embodiment should typically be considered as available for other similar features or aspects in other embodiments, and example embodiments are not necessarily mutually exclusive within one another. While one or more embodiments have been described with reference to the figures, it will be understood by those of ordinary skill in the art that various changes in form and details may be made therein without departing from the spirit and scope as defined by the following claims.

What is claimed is:

1. A capacitor comprising:
   a lower electrode comprising a perovskite material;
   an upper electrode spaced apart from the lower electrode;
   a dielectric layer between the lower electrode and the upper electrode and comprising a perovskite material; and
   a passivation layer between the lower electrode and the dielectric layer and comprising $Sr_xTi_yO_3$ in which a content of Ti is greater than a content of Sr.

2. The capacitor of claim 1, wherein the content of Ti in the passivation layer is 55% to 70%.

3. The capacitor of claim 1, wherein the lower electrode comprises one or more of $SrVO_3$, $SrMnO_3$, $SrCrO_3$, $SrFeO_3$, $SrCoO_3$ $SrRuO_3$, $SrMoO_3$, $SrIrO_3$, $SrNbO_3$, and $SrCoO_3$.

4. The capacitor of claim 1, wherein the lower electrode has a crystalline structure.

5. The capacitor of claim 1, wherein the dielectric layer comprises $SrTiO_3$.

6. The capacitor of claim 1, wherein the dielectric layer has a crystalline structure.

7. The capacitor of claim 1, wherein the dielectric layer comprises $SrTiO_3$ incorporating at least one of Ba and Y.

8. The capacitor of claim 1, wherein a ratio of a thickness of the passivation layer to a total thickness of the dielectric layer and the passivation layer is 1/20 to 1/5.

9. The capacitor of claim 1, wherein a total dielectric constant of the dielectric layer and the passivation layer is 60 to 80.

10. The capacitor of claim 1, wherein the upper electrode comprises a perovskite material.

11. The capacitor of claim 1, wherein the upper electrode comprises one or more of $SrVO_3$, $SrMnO_3$, $SrCrO_3$, $SrFeO_3$, $SrCoO_3$ $SrRuO_3$, $SrMoO_3$, $SrIrO_3$, $SrNbO_3$, and $SrCoO_3$.

12. An electronic device comprising:
    a transistor; and the capacitor of claim 1, the capacitor being electrically connected to the transistor.

13. The electronic device of claim 12, wherein the transistor comprises:
a semiconductor substrate comprising a source region, a drain region, and a channel region between the source region and the drain region; and
a gate stack on the semiconductor substrate, facing the channel region, and comprising a gate insulating layer and a gate electrode.

14. The electronic device of claim 12, further comprising:
a memory cell comprising the capacitor and the transistor; and
a controller electrically connected to the memory cell and configured to control the memory cell.

15. A method of fabricating a capacitor, the method comprising:
forming a lower electrode on a substrate, the lower electrode comprising a perovskite material;
forming a passivation layer on the lower electrode by using a first gas comprising Ti, a second gas comprising a hydroxyl group (OH), a third gas comprising an oxygen radical (O), and a fourth gas comprising Sr, wherein the passivation layer comprises $Sr_xTi_yO_3$ in a perovskite material structure, wherein a concentration of Ti is greater than a concentration of Sr;
forming a dielectric layer comprising a perovskite material on the passivation layer; and
forming an upper electrode on the dielectric layer.

16. The method of claim 15, wherein the forming of the passivation layer comprises:
exposing the lower electrode to the first gas for a first time;
sequentially exposing the lower electrode to the second gas for a second time and to the third gas for a third time, the sequentially exposing occurring after exposing the lower electrode to the first gas;
exposing the lower electrode to the fourth gas for a fourth time after exposing the lower electrode to the second gas and the third gas; and
exposing the lower electrode to the third gas for a fifth time after exposing the lower electrode to the fourth gas.

17. The method of claim 15, wherein the second gas comprises at least one of water ($H_2O$) and hydrogen peroxide ($H_2O_2$).

18. The method of claim 15, wherein the third gas comprises at least one of oxygen ($O_2$), ozone ($O_3$), and an oxygen radical (O).

19. The method of claim 16, wherein the forming of the passivation layer comprises an atomic layer deposition (ALD) operation.

20. The method of claim 16, wherein the lower electrode and the upper electrode each comprise one or more of $SrVO_3$, $SrMnO_3$, $SrCrO_3$, $SrFeO_3$, $SrCoO_3$ $SrRuO_3$, $SrMoO_3$, $SrIrO_3$, $SrNbO_3$, and $SrCoO_3$.

* * * * *